United States Patent
MacGougan et al.

(10) Patent No.: US 12,461,251 B2
(45) Date of Patent: Nov. 4, 2025

(54) DYNAMIC ADJUSTMENT OF COHERENT SIGNAL INTEGRATION FOR PROCESSING GLOBAL NAVIGATION SIGNALS

(71) Applicant: Apple Inc., Cupertino, CA (US)

(72) Inventors: Glenn D. MacGougan, San Jose, CA (US); Robert G. Lorenz, Menlo Park, CA (US); Kevin X. Chin, Palo Alto, CA (US); William J. Bencze, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 475 days.

(21) Appl. No.: 17/882,422

(22) Filed: Aug. 5, 2022

(65) Prior Publication Data

US 2024/0045080 A1    Feb. 8, 2024

(51) Int. Cl.
*G01S 19/30* (2010.01)
*G01S 19/29* (2010.01)

(52) U.S. Cl.
CPC ............ *G01S 19/30* (2013.01); *G01S 19/29* (2013.01)

(58) Field of Classification Search
CPC .......... G01S 19/30; G01S 19/29; G01S 19/26; G01S 19/24; G01S 19/05; G01S 19/39; G01S 19/07; G01S 19/42; G01S 19/27; G01S 19/35; G01S 19/34; G01S 19/37; G01S 19/21; G01S 19/22; G01S 19/246; G01S 19/31; G01S 19/235; G01S 19/47; G01S 19/23; G01S 5/0247; H04B 7/01; H04B 7/088; H04B 7/0695; H04B 7/0408; H04B 7/18513; H04B 7/2041; H04W 56/001; H04W 64/00; H04W 72/0446; H04W 72/046; H04W 24/04; H04W 48/16; G01C 21/165; G01C 21/26
USPC ..... 342/352, 328, 357.69, 373, 228, 357.22, 342/357.59, 357.61, 357.26, 357.51
See application file for complete search history.

(56) References Cited

U.S. PATENT DOCUMENTS

| | | | |
|---|---|---|---|
| 9,541,651 B2 | 1/2017 | Kurby | |
| 10,802,158 B2 | 10/2020 | Ledvina et al. | |
| 10,816,672 B2 | 10/2020 | Faragher et al. | |
| 11,294,067 B2 | 4/2022 | Lennen | |
| 11,346,958 B2 | 5/2022 | Lennen | |
| 2003/0184399 A1* | 10/2003 | Lanoue | H03L 1/022 331/176 |
| 2013/0136154 A1* | 5/2013 | Chomal | H04B 1/709 375/136 |
| 2015/0316651 A1* | 11/2015 | Kurby | G01S 19/30 342/357.51 |

(Continued)

*Primary Examiner* — Vladimir Magloire
*Assistant Examiner* — Remash R Guyah
(74) *Attorney, Agent, or Firm* — FLETCHER YODER PC (57) ABSTRACT

User equipment receives a GNSS signal that includes a GNSS signal from a satellite. The user equipment also receives a first data input from a motion sensor of the user equipment that is indicative of a motion of the user equipment, receives a second data input from the temperature sensor of the user equipment that is indicative of a temperature of the user equipment, and performs a coherent operation based on the pilot channel of the GNSS signal over a coherent period of time based on the first data input and the second data input to generate a resulting signal. The user equipment performs a non-coherent operation based on the resulting signal to amplify the resulting signal, and outputs a position of the user equipment based on the resulting signal.

20 Claims, 5 Drawing Sheets

(56) References Cited

U.S. PATENT DOCUMENTS

2017/0090037 A1* 3/2017 Ledvina .................. G01S 19/24

* cited by examiner

DYNAMIC ADJUSTMENT OF COHERENT SIGNAL INTEGRATION FOR PROCESSING GLOBAL NAVIGATION SIGNALS

BACKGROUND

The present disclosure relates generally to determining global positioning of user equipment, and more specifically to dynamically adjusting a period of coherent signal integration of a pilot channel of a navigation signal (e.g., a global navigation satellite signal) based on various factors.

User equipment may use navigation signals to determine a global position of the user equipment. For instance, the user equipment may process global positioning system (GPS) signals and/or global navigation satellite systems (GNSS) signals received from satellites and determine the global positioning of the user equipment based on the processed signals. However, such signals may be affected by oscillator dynamics and user dynamics associated with the user equipment while the signals are processed, thereby increasing noise present in the processed signals. As such, the accuracy of determining the global positioning of the user equipment is decreased.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, user equipment includes a motion sensor, a temperature sensors, a global navigation satellite systems (GNSS) receiver, and processing circuitry. The GNSS receiver receives a GNSS signal that includes a GNSS signal from a satellite. The processing circuitry receives a first data input from the motion sensor indicative of a motion of the user equipment, receives a second data input from the temperature sensor indicative of a temperature of the user equipment, and performs a coherent operation based on the pilot channel of the GNSS signal over a coherent period of time based on the first data input and the second data input to generate a resulting signal. The processing circuitry also performs a non-coherent operation based on the resulting signal to amplify the resulting signal, and outputs a position of the user equipment based on the resulting signal.

In another embodiment, one or more tangible, non-transitory, computer-readable media stores computer-readable instructions that cause one or more processors of user equipment to receive a data input indicative of a current condition of the user equipment, an expected condition of the user equipment, a current motion of the user equipment, an expected motion of the user equipment, or any combination thereof. The computer-readable instructions also cause the processors to determine a coherent period of time based on the data input, perform respective coherent operations based on each pilot channel of a GNSS signal received by the user equipment from a satellite to generate a resulting signal, perform a non-coherent operation based on the resulting signal, and output a position of the user equipment based on the resulting signal after performing the non-coherent operation.

In yet another embodiment, a method includes receiving, via a receiver of user equipment, global navigation satellite system (GNSS) signals that include respective pilot channels from multiple satellites. The method also includes receiving, via processing circuitry of the user equipment, a data input indicative of a temperature associated with an oscillator of the receiver, a change in temperature associated with the oscillator, a motion associated with the user equipment, a change in motion associated with the user equipment, or any combination thereof. The method further includes performing, via the processing circuitry, the respective coherent operations against the respective pilot channels of the GNSS signals over the respective coherent periods of time based on the data input to generate respective resulting signals, performing, via the processing circuitry, respective non-coherent operations based on the resulting signals, and outputting, via the processing circuitry, a position of the user equipment based on the resulting signals after performing the respective non-coherent operations.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

This disclosure is directed to dynamically adjusting a period of time for coherent signal integration for processing navigation signals (e.g., global navigation satellite signals and/or local navigation signals). In particular, various types of user equipment use global positioning system (GPS) and/or global navigation satellite system (GNSS) technology to determine a global position of the user equipment. For example, user equipment may receive signals from one or more GPS and/or GNSS satellites and process the signals to determine a global position of the user equipment. In additional or alternative embodiments, the navigation signals may include local navigation signals, such as from a local area satellite system (e.g., the Quasi-Zenith Satellite System or Michibiki, the Indian Regional Navigation Satellite System or NavIC) or a local navigation beacon. Because of the vast distance between the satellites and the user equipment, the power of the signals transmitted from the satellites is decreased when received at the user equipment. As such, after the user equipment receives a signal from a satellite, the user equipment may process the signal to amplify power of the signal before the user equipment determines the position of the user equipment based on the processed signals.

During processing of the signals to amplify the power of the signal, the user equipment performs a coherent signal integration operation (e.g., a coherent operation, a coherent correlation) followed by a non-coherent summation operation (e.g., a non-coherent operation, a non-coherent integration operation) against the signal. Coherent integration may include using carrier phase information, such that a receiver uses matched filters (or a correlation receiver) to detect and extract transmitted data. Non-coherent integration may not use carrier phase information, and use methods like square law (e.g., push detection or energy detection) to recover the transmitted data at the receiver. That is, coherent integration may include using an input signal and a reference signal to find a GNSS signal. A selection of a coherent time of integration may be based on a compromise between sensitivity and a time to first fix, where a longer period leads to higher sensitivity, but may increase a size of a scan area, leading to greater time consumption for processing. As used herein, a "coherent integration" operation or a "coherent correlation" operation refers to an operation that coherently acquires successive time slices of data and processes the time slices of data sequentially, not separately. Non-coherent integration (e.g., non-coherent summation) may use an output generated from the coherent integration to achieve additional signal to noise gain. The non-coherent integration may reduce a variance of noise, which nay improve acquisition probability, leading to gain in a system. The non-coherent integration may be performed by combining amplitudes of several coherent matrices sequentially, may be implemented after short periods of coherent integration, and may not be influenced by data bit transition. As used herein, a "non-coherent integration" operation or a "non-coherent summation" operation refers to an operation that acquires successive time slices of data but processes the time slices of data separately and sums the results of the processed time slices together.

In particular, during the coherent signal integration operation, the signal is integrated over a period of time (e.g., a coherent period of time) to generate a signal with a particular signal to noise ratio (SNR). Thereafter, during the non-coherent summation operation, the resulting signal is squared to increase the signal gain. Generally, a higher SNR in the resulting signal generated from the coherent signal integration operation may decrease or minimize a squaring loss that is incurred in the resulting signal from squaring the noise present in the resulting signal during the non-coherent summation operation. By decreasing or minimizing the squaring loss in the resulting signal from the non-coherent summation operation, the quality of the signal is increased, thereby increasing an accuracy in determining the position of the user equipment.

However, during manufacturing of conventional user equipment, a fixed value is typically selected for the coherent period of time for performing the coherent signal integration operation against the signal. Generally, integrating the signal over a longer coherent period of time generates a resulting signal with a higher SNR. But a number of factors may affect the signal during the coherent signal integration operation, which may decrease the SNR in the resulting signal. For instance, such factors may affect oscillator dynamics of the user equipment, such as motion experienced by a reference oscillator of the user equipment or thermal changes experienced by the reference oscillator of the user equipment, user dynamics associated with the user equipment, such as motion of the user equipment, and the like.

Accordingly, the disclosure relates to dynamically adjusting the coherent period of time for performing the coherent signal integration operation against the signal based on various types of data associated with the user equipment. For instance, the data may be indicative of a temperature associated with the user equipment, an expected change in temperature associated with the user equipment, a motion associated with the user equipment, an expected change in motion associated with the user equipment, or the like. By adjusting the coherent period of time to account for current and/or future conditions associated with the user equipment, a consistently, higher SNR in the resulting signal generated by performing the coherent signal integration operation. In this way, a squaring loss that is incurred in the resulting signal from squaring any noise present in the resulting signal during the non-coherent summation operation may be decreased or minimized, thereby increasing the quality of the signal for determining the position of the user equipment.

Figure 1:
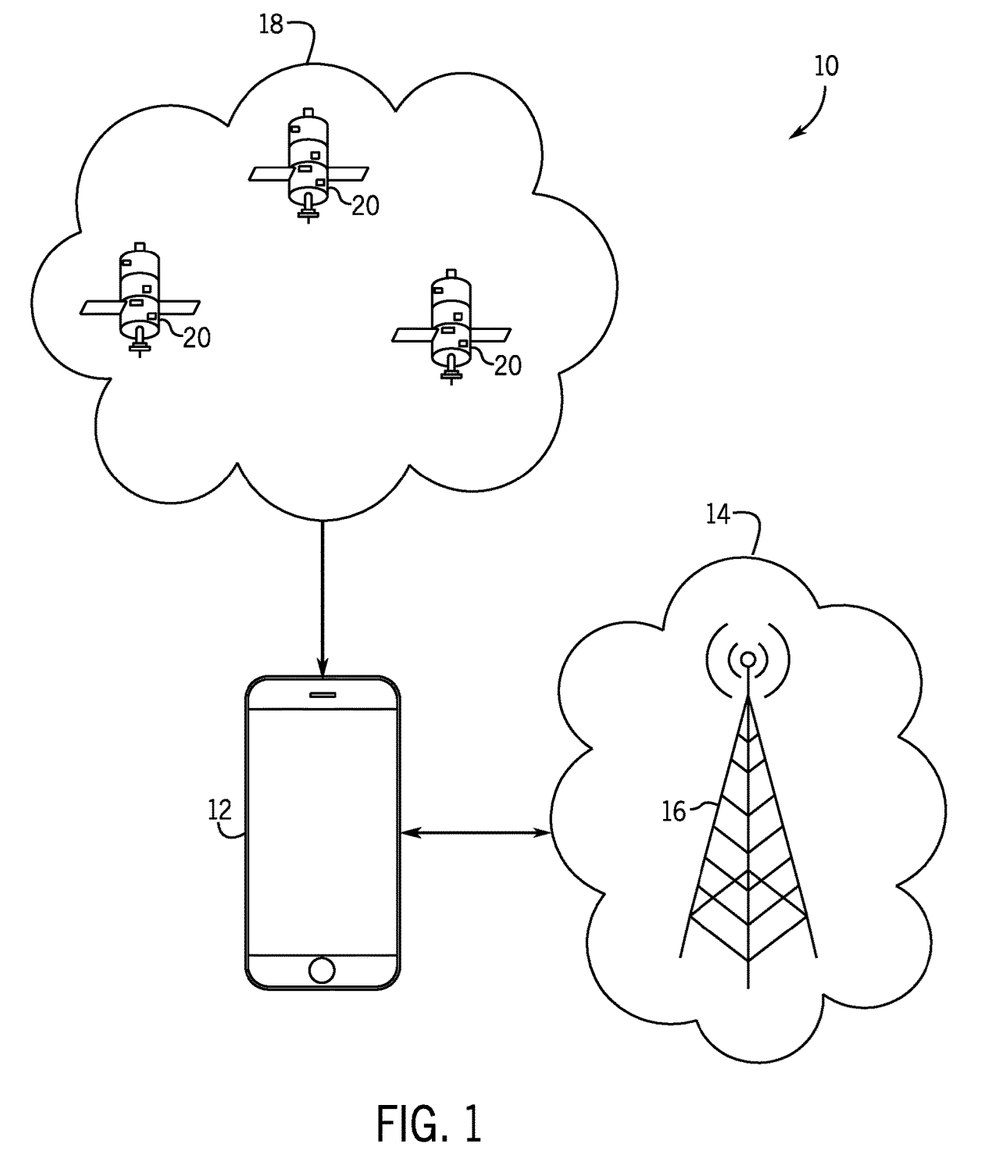
FIG. 1 is a schematic diagram of a communication system that includes user equipment communicatively coupled to a cellular network via a cellular base station, and communicatively coupled to a global navigation satellite systems (GNSS) network via one or more GNSS satellites, according to embodiments of the present disclosure.

FIG. 1 is a schematic diagram of a communication system 10 having user equipment 12 communicatively coupled to a cellular network 14 (e.g., a third generation (3G) cellular network, a fourth generation (4G) or Long Term Evolution (LTE) cellular network, a fifth generation (5G) or New Radio (NR) cellular network, a beyond 5G cellular network, or the like) via a cellular base station 16 (e.g., a NodeB, an eNodeB, a gNodeB, or the like), and communicatively coupled to a GNSS network 18 via one or more GNSS satellites 20, accordingly to embodiments of the present disclosure. The cellular network 14 may be implemented and/or supported by multiple such base stations 16, radio access networks, core networks, and so on. Similarly, the GNSS network 18 may be implemented and/or supported by multiple such GNSS satellites 20, ground stations, and so on. Although certain embodiments are described herein with respect to processing a GNSS signal from one or more GNSS satellites 20, it should be understood that in other embodiments, the user equipment 12 may be communicatively coupled to a GPS network in addition to, or instead of, the GNSS network 18 via one or more GPS satellites and process a GPS signal from the GPS satellites in accordance with embodiments described herein.

The user equipment 12 may receive signals from the GNSS satellites 20 and process the signals to determine a global position of the user equipment 12. In particular, each GNSS satellite 20 may transmit one or more pilot channels alongside a data signal. Each pilot channel is a dataless signal transmitted from a corresponding GNSS satellite 20. The user equipment 12 may process one or more of the pilot channels from one or more GNSS satellites 20 to determine the position of the user equipment 12. In certain embodiments, the user equipment 12 may generate and maintain respective tracking loops for each pilot channel received from the GNSS satellites 20. For instance, the user equipment 12 may receive a single pilot channel from a GNSS satellite 20, two pilot channels from a GNSS satellite 20, three pilot channels from a GNSS satellite 20, four pilot channels from a GNSS satellite 20, five pilot channels or more from a GNSS satellite 20, and so on. Additionally, the user equipment 12 may receive pilot channels from more than one GNSS satellite 20 (e.g., up to thirty-five or more satellites).

Figure 2:
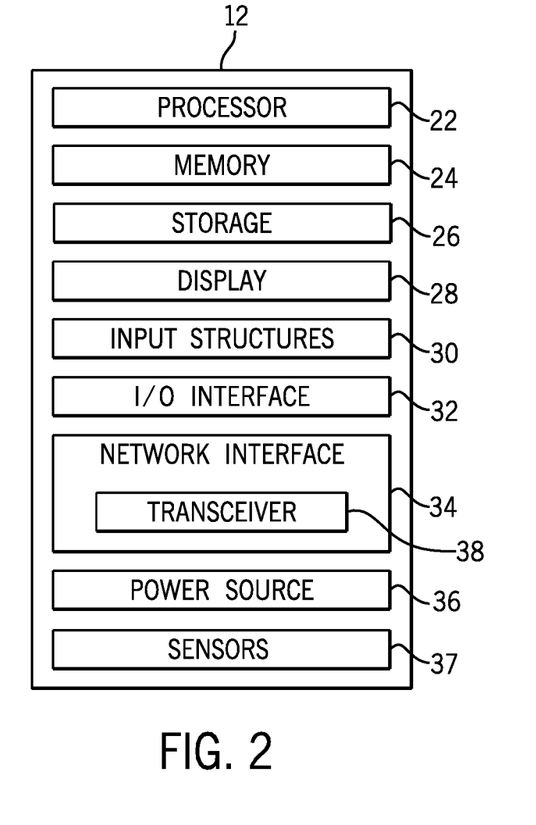
FIG. 2 is a block diagram of the user equipment of FIG. 1, according to embodiments of the present disclosure.

FIG. 2 is a block diagram of the user equipment 12 (e.g., an electronic device) of FIG. 1, according to embodiments of the present disclosure. The user equipment 12 may include, among other things, one or more processors 22 (collectively referred to herein as a single processor for convenience, which may be implemented in any suitable form of processing circuitry), memory 24, nonvolatile storage 26, a display 28, input structures 30, an input/output (I/O) interface 32, a network interface 34, a power source 36, and one or more sensors 37. The various functional blocks shown in FIG. 2 may include hardware elements (including circuitry), software elements (including machine-executable instructions) or a combination of both hardware and software elements (which may be referred to as logic). The processor 22, the memory 24, the nonvolatile storage 26, the display 28, the input structures 30, the I/O interface 32, the network interface 34, the power source 36, and/or the sensors 37 may each be communicatively coupled directly or indirectly (e.g., through or via another component, a communication bus, a network) to one another to transmit and/or receive data between one another. It should be noted that FIG. 2 is merely one example of a particular implementation and is intended to illustrate the types of components that may be present in the user equipment 12.

By way of example, the user equipment 12 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple, Inc. of Cupertino, California), a wearable electronic device (e.g., in the form of an Apple Watch® by Apple Inc. of Cupertino, California), and other similar devices. It should be noted that the processor 22 and other related items in FIG. 2 may be generally referred to herein as "data processing circuitry." Such data processing circuitry may be embodied wholly or in part as software, hardware, or both. Furthermore, the processor 22 and other related items in FIG. 2 may be a single contained processing module or may be incorporated wholly or partially within any of the other elements within the user equipment 12. The processor 22 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processor 22 may include one or more application processors, one or more baseband processors, or both, and perform the various functions described herein.

In the user equipment 12 of FIG. 2, the processor 22 may be operably coupled with a memory 24 and a nonvolatile storage 26 to perform various algorithms. Such programs or instructions executed by the processor 22 may be stored in any suitable article of manufacture that includes one or more tangible, computer-readable media. The tangible, computer-readable media may include the memory 24 and/or the nonvolatile storage 26, individually or collectively, to store the instructions or routines. The memory 24 and the nonvolatile storage 26 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 22 to enable the user equipment 12 to provide various functionalities.

In certain embodiments, the display 28 may facilitate users to view images generated on the user equipment 12. In some embodiments, the display 28 may include a touch screen, which may facilitate user interaction with a user interface of the user equipment 12. Furthermore, it should be appreciated that, in some embodiments, the display 28 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 30 of the user equipment 12 may enable a user to interact with the user equipment 12 (e.g., pressing a button to increase or decrease a volume level). The I/O interface 32 may enable user equipment 12 to interface with various other electronic devices, as may the network interface 34. In some embodiments, the I/O interface 32 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 34 may include, for example, one or more interfaces for a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a third generation (3G) cellular network, a universal mobile telecommunication system (UMTS), a fourth generation (4G) cellular network, a long term evolution (LTE®) cellular network, a long term evolution licenses assisted access (LTE-LAA) cellular network, a fifth generation (5G) cellular network, New Radio (NR) cellular network, a cellular network beyond 5G, a satellite network, and so on. In particular, the network interface 34 may include, for example, one or more interfaces for using a Release-15 cellular communication standard of the 5G specifications that include the millimeter (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 34 of the user equipment 12 may allow communication over the aforementioned networks (e.g., 5G, Wi-Fi, LTE-LAA, and so forth).

The network interface 34 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 34 includes a transceiver 38. In some embodiments, all or portions of the transceiver 38 may be disposed within the processor 22. The transceiver 38 may support transmission and receipt of various wireless signals via one or more antennas, and thus may include a transmitter and a receiver. The power source 36 of the user equipment 12 may include any suitable source of power, such as a rechargeable lithium polymer (Li-poly) battery and/or an alternating (AC) power converter.

The sensors 37 of the user equipment 12 may include one or more motion sensors, one or more temperature sensors, one or more light sensors, one or more pressure sensors, one or more cameras or image sensors, or any other suitable sensors. In certain embodiments, the motion sensors may include an inertial measurement unit (IMU), a three-dimensional accelerometer, a three-dimensional gyroscope, or the like, that may detect a motion of the user equipment 12. For example, the IMU may detect a rotation of the user equipment 12, a rotational movement of the user equipment 12, an angular displacement of the user equipment 12, a tilt of the user equipment 12, an orientation of the user equipment 12, a linear motion of the user equipment 12, a non-linear motion of the user equipment 12, or the like. The temperature sensors may include a temperature sensor that may measure a temperature of an oscillator of a GNSS receiver of the user equipment 12, an internal temperature of the user equipment 12, a circuit junction temperature of the user equipment 12, an external temperature of the user equipment 12, or the like. The light sensors may detect a quantity of ambient light external to the user equipment 12. The pressure sensors may include, for example, a barometer, that may detect an atmospheric pressure associated with the user equipment 12. The sensors 37 may additionally or alternatively include one or more cameras, such as onboard cameras for visual inertial odometry and/or other suitable position/location sensing techniques.

Figure 3:
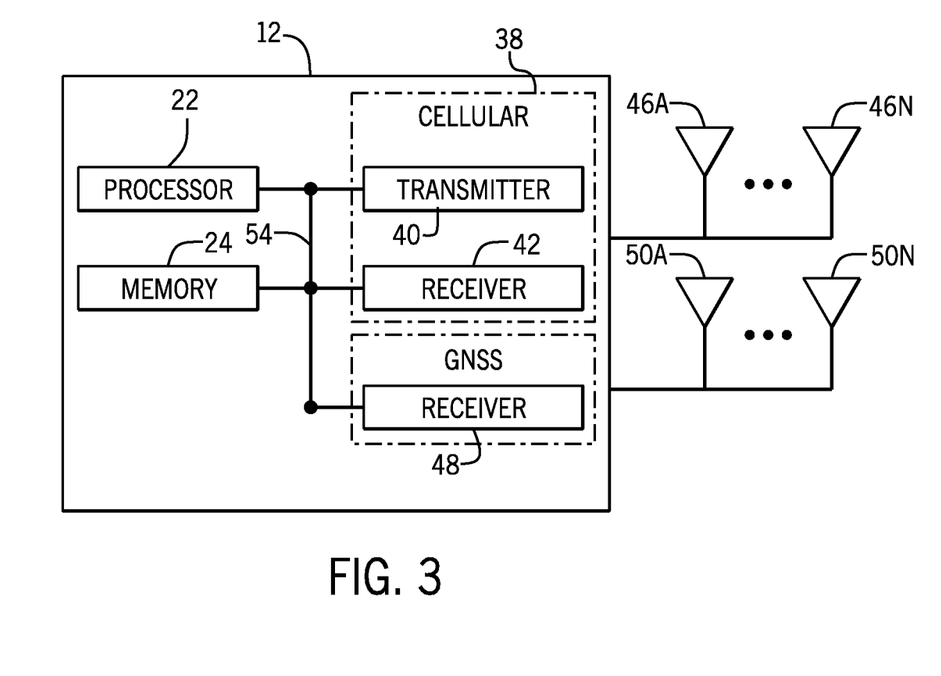
FIG. 3 is a functional diagram of the user equipment of FIG. 1, according to embodiments of the present disclosure.

FIG. 3 is a functional diagram of the user equipment 12 of FIGS. 1 and 2, according to embodiments of the present disclosure. As illustrated, the processor 22, the memory 24, the transceiver 38, a transmitter 40, a receiver 42, antennas 46 (illustrated as 46A-46N, collectively referred to as an antenna 46), and/or a GNSS receiver 48 may be communicatively coupled directly or indirectly (e.g., through or via another component, a communication bus, a network) to one another to transmit and/or receive data between one another.

In particular, the transceiver 38 may be in the form of a cellular transceiver 38 having a cellular transmitter 40 and/or a cellular receiver 42 that respectively enable transmission and reception of cellular signals between the user equipment 12 and an external device via, for example, a cellular network (e.g., including base stations, such as NodeBs, eNBs or eNodeBs (Evolved NodeBs or E-UTRAN (Evolved Universal Mobile Telecommunication System (UMTS) Terrestrial Radio Access Network) NodeBs, or gNBs or gNodeBs (e.g., Next Generation NodeB)). As illustrated, the cellular transmitter 40 and the cellular receiver 42 may be combined into the cellular transceiver 38.

Additionally, the user equipment 12 may also include the GNSS receiver 48 that may enable the user equipment 12 to receive GNSS signals from a GNSS network (e.g., GNSS network 18 of FIG. 1), including one or more GNSS satellites (e.g., GNSS satellites 20 of FIG. 1) or GNSS ground stations. The GNSS signals may include a GNSS satellite's observation data, broadcast orbit information of tracked GNSS satellites, and supporting data, such as meteorological parameters, collected from co-located instruments of a GNSS satellite. For example, the GNSS signals may be received from a Global Positions System (GPS) network, a Global Navigation Satellite System (GLONASS) network, a BeiDou Navigation Satellite System (BDS), a Galileo navigation satellite network, a Quasi-Zenith Satellite System (QZSS or Michibiki) and so on.

As described above, the GNSS receiver 48 may receive GNSS signals from the GNSS satellites 20 and process the signals to determine a global position of the user equipment 12. In particular, each GNSS satellite 20 may transmit one or more pilot channels alongside a data signal. Each pilot channel is a dataless signal transmitted from a corresponding GNSS satellite 20. The user equipment 12 may process one or more of the pilot channels from one or more GNSS satellites 20 to determine the position of the user equipment 12.

The GNSS receiver 48 may process the received pilot channels of the GNSS signals from each GNSS satellite 20 to amplify the power of the pilot channels, generate and maintain tracking loops for each pilot channel, and determine the position of the user equipment 12 based on each pilot channel. For instance, the GNSS receiver 48 may amplify the power of the pilot channels and generate the tracking loop for each pilot channel by performing a series of signal processing operations based on the received pilot channel. The GNSS receiver 48 may then perform a radio frequency (RF) down-conversion operation, a sampling operation, a Doppler removal operation, a coherent signal integration operation, and a non-coherent summation operation based on the received pilot channel. However, in certain embodiments, it should be understood that the GNSS receiver 48 may perform the signal processing operations in different sequences than the sequence described, and certain operations may be skipped or not performed altogether.

The GNSS receiver 48 may include a frequency stability prediction engine, which may be implemented as hardware (e.g., circuitry), software (e.g., instructions stored in the memory 24 and/or the storage 26), or both (e.g., as logic). As mentioned above, during the coherent signal integration operation performed by the GNSS receiver 48 against a pilot channel of a received GNSS signal, the GNSS receiver 48 integrates the pilot channel over a coherent period of time to generate a resulting signal with a particular signal to noise ratio (SNR). Thereafter, during the non-coherent summation operation, the resulting signal is squared to increase the signal gain. Generally, a higher SNR in the resulting signal generated from the coherent signal integration operation will minimize a squaring loss that is incurred in the resulting signal from squaring the noise present in the resulting signal during the non-coherent summation operation. As such, by minimizing the squaring loss in the resulting signal from the non-coherent summation operation, the quality of the signal is increased, thereby increasing an accuracy in determining the position of the user equipment.

However, a number of factors may affect the signal during the coherent signal integration operation, which can decrease the SNR in the resulting signal. For instance, such factors may affect oscillator dynamics of the user equipment 12, such as motion experienced by a reference oscillator of the GNSS receiver 48 or thermal changes experienced by the reference oscillator of the GNSS receiver 48, and user dynamics associated with the user equipment 12, such as motion of the user equipment 12, thermal changes associated with the user equipment 12, and the like. Accordingly, the frequency stability prediction engine of the GNSS receiver 48 may dynamically adjust the coherent period of time for performing the coherent signal integration operation against the pilot channel of the GNSS signal based on various types of data associated with the user equipment 12. For instance, the frequency stability prediction engine of the GNSS receiver 48 may receive data from one or more sensors 37 associated with the user equipment 12 that are indicative of current and/or expected conditions associated with the user equipment 12 (e.g., motion, temperature, light, pressure, and so on). In certain embodiments, the data may be indicative of a temperature associated with the reference oscillator of the GNSS receiver 48, the user equipment, or both; an expected change in temperature associated with the reference oscillator of the GNSS receiver 48, the user equipment, or both; a motion associated with the reference oscillator of the GNSS receiver 48, the user equipment, or both; an expected change in motion associated with the reference oscillator of the GNSS receiver 48, the user equipment, or both; or the like.

In some embodiments, the user equipment 12 may determine a current motion associated with the user equipment 12 or an expected motion associated with the user equipment 12 based on data from the sensors 37. For instance, the user equipment 12 may determine an orientation, a position, or both, of the user equipment 12 with respect to a user of the user equipment 12. The user equipment 12 may determine that the orientation or the position of the user equipment 12 is indicative of a stationary orientation or position of the user equipment 12, a changing orientation or position of the user equipment 12, or the like. For instance, the user equipment 12 may determine that the user is holding the user equipment 12 in a hand of the user, the user is walking with the user equipment 12 in a hand of the user, the user is jogging with the user equipment 12 in a hand of the user, the user is running with the user equipment 12 in a hand of the user, the user is carrying the user equipment 12 in a pocket of the user, the user is walking with the user equipment 12 in a pocket of the user, the user is jogging with the user equipment 12 in a pocket of the user, the user is running with the user equipment 12 in a pocket of the user, the user is driving a vehicle with the user equipment 12 in the vehicle, and the like. The frequency stability prediction engine of the GNSS receiver 48 may receive data indicative of the orientation or the position of the user equipment 12 from the user equipment 12 (e.g., the processor 22, the memory 24, the storage 26).

The frequency stability prediction engine of the GNSS receiver 48 may also receive other suitable types of data or information from the user equipment 12 that are indicative of factors that may affect the pilot channel of the GNSS signal during the coherent signal integration operation. For instance, the frequency stability prediction engine of the GNSS receiver 48 may receive data indicative of an upcoming transmission from an antenna associated with the user equipment 12, data indicative of a powering down of an antenna associated with the user equipment 12, data indicative of a powering on of a cellular power amplifier associated with the user equipment 12, data indicative of a powering down of a cellular power amplifier associated with the user equipment 12, or the like.

After receiving data associated with the user equipment 12 that may be indicative of one or more factors that may affect the pilot channel of the GNSS signal during the coherent signal integration operation, the frequency stability prediction engine of the GNSS receiver 48 may determine a corresponding period of time (e.g., a coherent period of time) for performing the coherent signal integration operation (e.g., coherent operation) against the pilot channel of the GNSS signal. In certain embodiments, the frequency stability predication engine of the GNSS receiver 48 may compare the data received from the user equipment 12 pre-defined values of the coherent period of time (e.g., stored in a look-up table in the memory 24 or the storage 26). For instance, the different values for the coherent period of time may be associated with one or more data inputs indicative of the respective factors that may affect the pilot channel of the GNSS signal during the coherent signal integration operation. In some embodiments, the values of the coherent period may be pre-determined by a manufacturer of the user equipment 12. In other embodiments, the user equipment 12 may receive one or more updates to the values over time to update the values of the coherent period that correspond to the data inputs indicative of the respective factors that may affect the pilot channel of the GNSS signal during the coherent signal integration operation.

After the frequency stability prediction engine of the GNSS receiver 48 determines a corresponding coherent period of time for performing the coherent signal integration operation against the pilot channel of the GNSS signal, the GNSS receiver 48 may perform the coherent signal integration against the pilot channel of the GNSS signal using the determined coherent period of time. By adjusting the coherent period of time for performing the coherent signal integration operation to account for current and/or expected conditions associated with the user equipment 12, a higher SNR of the resulting signal may be obtained. In this way, the squaring loss that is incurred in the resulting signal from squaring any noise present in the resulting signal during the subsequent non-coherent summation operation may be decreased or minimized, thereby increasing the quality of the signal for determining the position of the user equipment 12.

The user equipment 12 may also have one or more antennas 46A-46N (collectively 46) electrically coupled to the cellular transceiver 38, and one or more antennas (collectively 50) electrically coupled to the GNSS receiver 48. The antennas 46, 50 may be configured in an omnidirectional or directional configuration, in a single-beam, dual-beam, or multi-beam arrangement, and so on. Each antenna 46, 50 may be associated with one or more beams and various configurations. In some embodiments, multiple antennas of the antennas 46, 50 of an antenna group or module may be communicatively coupled to a respective transceiver 38 or the GNSS receiver 48 and each emit radio frequency signals that may constructively and/or destructively combine to form a beam. The user equipment 12 may include multiple transmitters, multiple receivers, multiple transceivers, and/or multiple antennas as suitable for various communication standards.

As illustrated, the various components of the user equipment 12 may be coupled together by a bus system 54. The bus system 54 may include a data bus, for example, as well as a power bus, a control signal bus, and a status signal bus, in addition to the data bus. The components of the user equipment 12 may be coupled together or accept or provide inputs to each other using some other mechanism.

Figure 4:
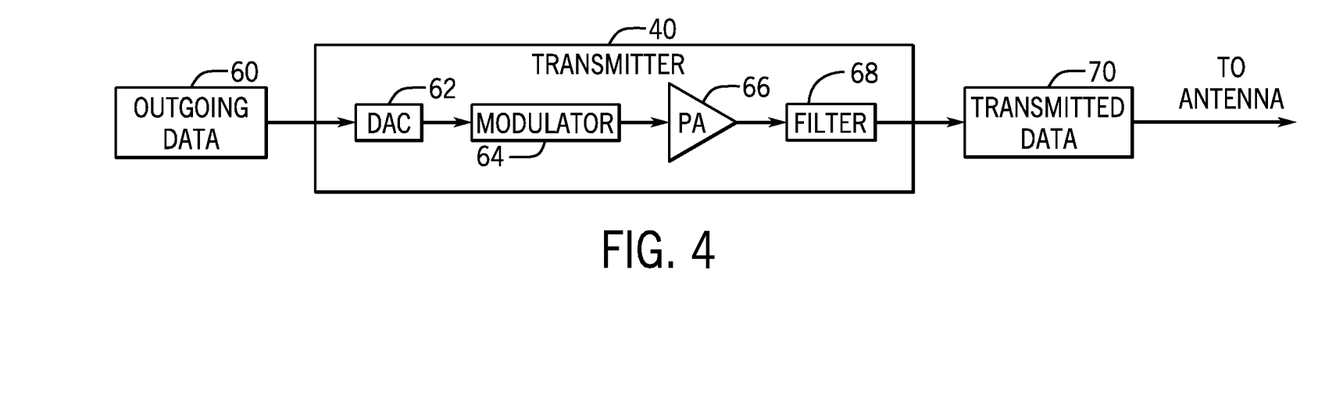
FIG. 4 is a schematic diagram of a transmitter of the user equipment of FIG. 1, according to embodiments of the present disclosure.

FIG. 4 is a schematic diagram of the cellular transmitter 40 (e.g., transmit circuitry), according to embodiments of the present disclosure. As illustrated, the cellular transmitter 40 may receive outgoing data 60 in the form of a digital signal to be transmitted via the one or more antennas 46. A digital-to-analog converter (DAC) 62 of the cellular transmitter 40 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 46. A filter 68 (e.g., filter circuitry and/or software) of the cellular transmitter 40 may then remove undesirable noise from the amplified signal to generate transmitted data 70 to be transmitted via the antennas 46. The filter 68 may include any suitable filter or filters to remove the undesirable noise from the amplified signal, such as a bandpass filter, a bandstop filter, a low pass filter, a high pass filter, and/or a decimation filter. Additionally, the cellular transmitter 40 may include any suitable additional components not shown, or may not include certain of the illustrated components, such that the cellular transmitter 40 may transmit the outgoing data 60 via the antennas 46. For example, the cellular transmitter 40 may include a mixer and/or a digital up converter. As another example, the cellular transmitter 40 may not include the filter 68 if the power amplifier 66 outputs the amplified signal in or approximately in a desired frequency range (such that filtering of the amplified signal is unnecessary).

Figure 5:
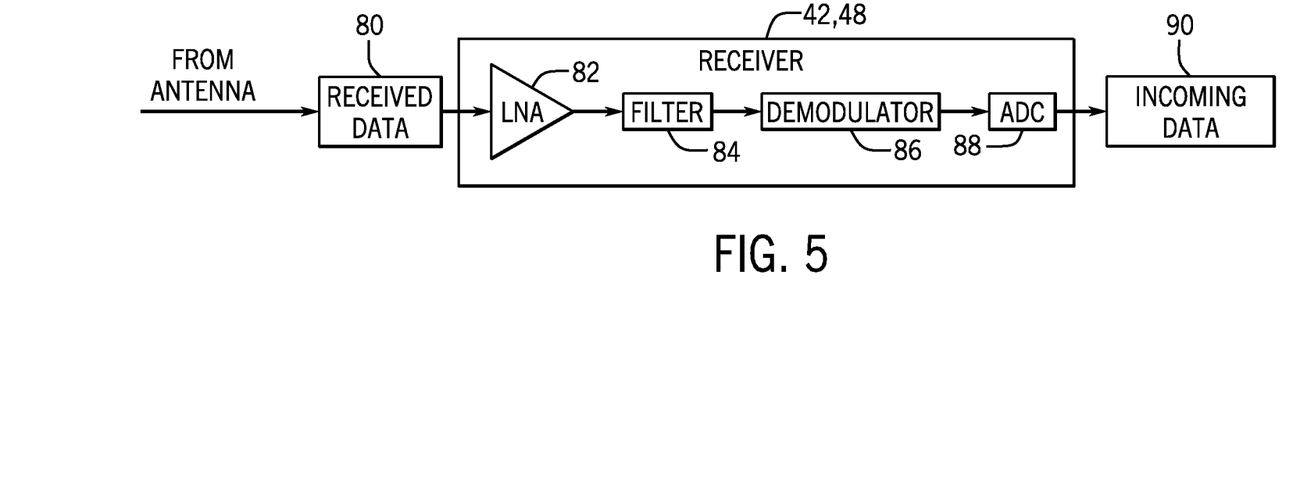
FIG. 5 is a schematic diagram of a receiver of the user equipment of FIG. 1, according to embodiments of the present disclosure.

FIG. 5 is a schematic diagram of a receiver 42, 48 (e.g., receive circuitry) of the user equipment 12, according to embodiments of the present disclosure. In particular, the receiver 42, 48 may include the cellular receiver 42 and/or the GNSS receiver 48 shown in FIG. 3. As illustrated, the receiver 42, 48 may receive received data 80 (e.g., cellular data or GNSS data) from one or more antennas 46, 50 in the form of an analog signal. A low noise amplifier (LNA) 82 may amplify the received analog signal to a suitable level for the receiver 42, 48 to process. Additionally, or alternatively, the receiver 48 may receive one or more pilot channels of respective GNSS signals from one or more GNSS satellites 20. The receiver 48 may then perform techniques described herein to dynamically adjust the coherent period of time for performing a coherent signal integration operation against each pilot channel based on various types of data associated with the user equipment 12, according to embodiments of the present disclosure.

A filter 84 (e.g., filter circuitry and/or software) may remove undesired noise from the received signal. The filter 84 may also remove additional signals received by the antennas 46, 50 that are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. For example, the filter 84 may include one or more resource-block combination-based machine-learning filters that filter transmission signals of a certain frequency from the GNSS receive signal.

The receiver 42, 48 may also include a demodulator 86 that removes a radio frequency envelope and/or extract a demodulated signal from the filtered signal for processing. An analog-to-digital converter (ADC) 88 may receive the demodulated analog signal and convert the signal to a digital signal of incoming data 90 to be further processed by the user equipment 12. Additionally, the receiver 42, 48 may include any suitable additional components not shown, or may not include certain of the illustrated components, such that the receiver 42, 48 may receive the received data 80 via the antennas 46, 50. For example, the receiver 42, 48 may include a mixer and/or a digital down converter.

Figure 6:
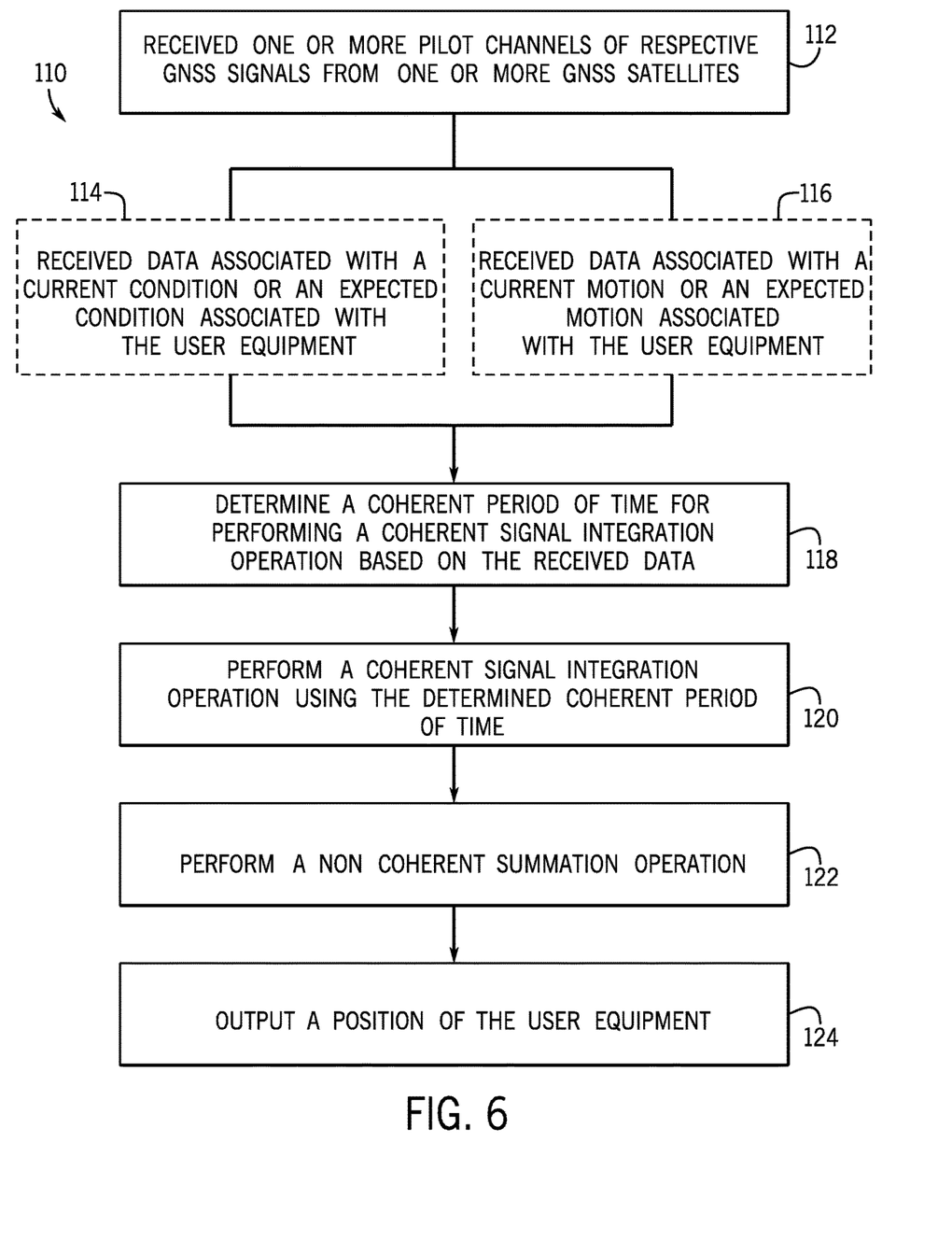
FIG. 6 is a flowchart of a method for dynamically adjusting a coherent period of time for coherent signal integration during signal processing of one or more pilot channels and determining a position of user equipment based on signals generated from the signal processing of the pilot channels, according to embodiments of the present disclosure.

With the foregoing in mind, FIG. 6 is a flowchart of a method 110 for determining a position of user equipment based on one or more pilot channels of respective GNSS signals, according to embodiments of the present disclosure. In particular, a period of time (e.g., a coherent period of time) for performing a coherent signal integration operation (e.g., a coherent operation) against the pilot channels of the respective GNSS signals is determined based on data associated with a current and/or expected condition associated with the user equipment 12, data associated with a current and/or expected motion associated with the user equipment 12, or both. Any suitable device (e.g., a controller) that may control components of the user equipment 12, such as the processor 22 and/or the GNSS receiver 48, may perform the method 110. In some embodiments, the method 110 may be implemented by executing instructions stored in a tangible, non-transitory, computer-readable medium, such as the memory 24 or the storage 26, using the processor 22 and/or the GNSS receiver 48. For example, the method 110 may be performed at least in part by one or more software components, such as an operating system of the user equipment 12, one or more software applications of the user equipment 12, a firmware of the GNSS receiver 48, and the like. While the method 110 is described using steps in a specific sequence, it should be understood that the present disclosure contemplates that the described steps may be performed in different sequences than the sequence illustrated, and certain described steps may be skipped or not performed altogether.

In process block 112, the GNSS receiver 48 of the user equipment 12 receives one or more pilot channels of respective GNSS signals from one or more GNSS satellites 20. As described above, each GNSS satellite 20 may transmit one or more pilot channels alongside a data signal. The user equipment 12 may process one or more of the pilot channels from one or more GNSS satellites 20 to determine a position of the user equipment 12. In particular, the user equipment 12 may generate and maintain respective tracking loops for each pilot channel received from the GNSS satellites 20.

In process block 114, the GNSS receiver 48 may optionally receive data associated with a current condition or an expected condition associated with the user equipment 12. For example, the data may be indicative of a temperature associated with the user equipment 12, a reference oscillator of the GNSS receiver 48, or both, a thermal change associated with the user equipment 12, the reference oscillator, or both, or any other condition that may affect the signal during the coherent signal integration operation. In certain embodiments, the GNSS receiver 48 may receive the data from one or more sensors 37 associated with the user equipment 12 (e.g., motion, temperature, light, pressure, and so on) and/or the reference oscillator of the GNSS receiver 48.

In process block 116, the GNSS receiver 48 may optionally receive data associated with a current motion or an expected motion associated with the user equipment 12. For instance, the user equipment 12 may determine an orientation, a position, or both, of the user equipment 12 with respect to a user of the user equipment 12. The user equipment 12 may determine that the orientation or the position of the user equipment 12 is indicative of a stationary orientation or position of the user equipment 12, a changing orientation or position of the user equipment 12, or the like. For example, the user equipment 12 may determine that the user is holding the user equipment 12 in a hand of the user, the user is walking with the user equipment 12 in a hand of the user, the user is jogging with the user equipment 12 in a hand of the user, the user is running with the user equipment 12 in a hand of the user, the user is carrying the user equipment 12 in a pocket of the user, the user is walking with the user equipment 12 in a pocket of the user, the user is jogging with the user equipment 12 in a pocket of the user, the user is running with the user equipment 12 in a pocket of the user, the user is driving a vehicle with the user equipment 12 in the vehicle, and the like. In certain embodiments, the GNSS receiver 48 may receive the data from one or more components of the user equipment 12 (e.g., the processor 22, the memory 24, the storage 26).

In process block 118, the GNSS receiver 48 determines a period of time (e.g., a coherent period of time) for performing a coherent signal integration operation (e.g., a coherent operation) against each pilot channel based on the data received in process block 114 and/or process block 116. For example, the GNSS receiver 48 may dynamically adjust the coherent period of time for performing the coherent signal integration operation based on the received data. The GNSS receiver 48 may compare the received data to a threshold associated with the type of data. For instance, if the received data (e.g., temperature data, light data, pressure data, motion data) is greater than a first threshold, the GNSS receiver 48 may determine to decrease the coherent period of time. If the received data is less than a second threshold, the GNSS receiver 48 may determine to increase the coherent period of time. That is, if the received data is indicative of a condition associated with the user equipment 12 (e.g., the oscillator of the user equipment 12) that would destabilize the pilot channel of the GNSS signal during the coherent signal integration operation, the GNSS receiver 48 may decrease the coherent period of time accordingly. For instance, the GNSS receiver 48 may determine a longer coherent period of time (e.g., 20 milliseconds (ms) or 40 ms) for performing the coherent signal integration if the user equipment 12 is stable (e.g., not moving, not exposed to high or low temperatures) and a shorter coherent period of time (e.g., less than 20 ms) if the user equipment 12 is unstable (e.g., moving, exposed to high or low temperatures).

In certain embodiments, the GNSS receiver 48 may compare the data received in process block 114 and/or process block 116 to pre-defined values (e.g., stored in a look-up table) for the coherent period of time associated with various types of data inputs indicative of respective factors (e.g., conditions associated with the user equipment 12 and/or the reference oscillator of the GNSS receiver 48, motions associated with the user equipment 12) that may affect the pilot channels during the coherent signal integration operation. In other embodiments, the GNSS receiver 48 may reference a file that includes a binary decision tree that associates pre-defined values for the coherent period of time with the respective factors that may affect the pilot channels during the coherent signal integration operation. For instance, the binary decision tree may direct the GNSS receiver 48 to apply a first coherent period of time if the user equipment 12 is not moving and apply a second coherent period of time if the user equipment 12 is moving, apply a third coherent period of time if the user equipment 12 is being used during the day and apply a fourth coherent period of time if the user equipment 12 is being used at night, or the like.

In process block 120, the GNSS receiver 48 performs the coherent signal integration operation against the pilot channels using the coherent period of time determined in process block 118. In certain embodiments, the GNSS receiver 48 may perform respective coherent signal integrations against each pilot channel using the same coherent period of time. In other embodiments, the GNSS receiver 48 may perform respective coherent signal integrations against each pilot channel using two or more different coherent period of times.

As mentioned above, the GNSS receiver 48 may perform a series of signal processing operations based on each pilot channel of a respective GNSS signal received from the GNSS satellites 20 to amplify the power of the pilot channels. For instance, the series of signal processing operations may include a radio frequency (RF) down-conversion operation, a sampling operation, a Doppler removal operation, a coherent signal integration operation, and a non-coherent summation operation. After the GNSS receiver 48 has performed the Doppler removal operation against a pilot channel, the GNSS receiver 48 performs the coherent signal integration operation against the pilot channel using the coherent period of time determined in process block 118. In particular, the GNSS receiver 48 integrates the pilot channel over the coherent period of time to generate a resulting signal.

In process block 122, the GNSS receiver 48 performs the non-coherent summation operation (e.g., non-coherent operation) to increase the signal gain in the resulting signal generated in process block 120. In particular, the GNSS receiver 48 squares each value in the resulting signal to amplify the signal. Because the coherent period of time was adjusted to account for any factors that might have increased the noise present in the resulting signal generated in process block 120, the squaring loss from the non-coherent summation operation is minimized, thereby increasing the quality of the signal.

Thereafter, in process block 124, the GNSS receiver 48 determines the position of the user equipment 12 based on one or more processed signals. For instance, the GNSS receiver 48 may perform process blocks 110 to 122 for multiple pilot channels of respective GNSS signals received from respective GNSS satellites 20. After the GNSS receiver 48 has performed the signal processing operations described above for each pilot channel, the GNSS receiver 48 may perform respective ranging measurements against the resulting signals generated from each pilot channel. In particular, the GNSS receiver 48 may perform the respective ranging measurements to determine respective distances from each corresponding GNSS satellite 20. The GNSS receiver 48 may then determine a position of the user equipment 12 based on the determined distances.

In certain embodiments, the GNSS receiver 48 may perform process blocks 110 to 122 for two or more pilot channels associated with a GNSS signal from a respective GNSS satellite 20. For instance, in process block 118, the GNSS receiver 48 may determine a first coherent period of time for performing a first coherent signal integration against a first pilot channel to generate a first resulting signal and a second coherent period of time for performing a second coherent signal integration against a second pilot channel to generate a second resulting signal. The GNSS receiver 48 may then perform respective non-coherent summation operations against the first coherent signal and the second coherent signal to amplify the respective signals and perform ranging measurements based on the amplified signals. The GNSS receiver 48 may then determine which ranging measurement is more accurate and use the more accurate ranging measurement to determine the position of the user equipment 12.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. User equipment, comprising:
    a motion sensor;
    a temperature sensor;
    a global navigation satellite systems (GNSS) receiver configured to receive a GNSS signal from a satellite, wherein the GNSS signal comprises a pilot channel; and
    processing circuitry configured to
        receive a first data input from the motion sensor indicative of a motion of the user equipment,
        receive a second data input from the temperature sensor indicative of a temperature of the user equipment,
        perform a coherent signal integration operation using the first data input and the second data input based on the pilot channel of the GNSS signal over a coherent period of time to generate a first resulting signal,
        perform a non-coherent operation based on the first resulting signal to amplify the first resulting signal and generate a second resulting signal, and
        output a position of the user equipment based on the second resulting signal.

2. The user equipment of claim 1, wherein the processing circuitry is configured to receive a second GNSS signal from a second satellite, the second GNSS signal comprising a second pilot channel, and wherein the processing circuitry is configured to perform a second coherent operation based on the second pilot channel of the second GNSS signal over the coherent period of time.

3. The user equipment of claim 1, wherein the processing circuitry is configured to receive a second GNSS signal from a second satellite, the second GNSS signal comprising a second pilot channel, and wherein the processing circuitry is configured to perform a second coherent signal integration operation using the first data input and the second data input based on the second pilot channel of the second GNSS signal over a second coherent period of time.

4. The user equipment of claim 1, wherein the first data input is indicative of a change in orientation of the user equipment.

5. The user equipment of claim 1, wherein the temperature sensor is associated with an oscillator of the GNSS receiver.

6. The user equipment of claim 5, wherein the second data input is indicative of a temperature of the oscillator.

7. The user equipment of claim 1, wherein the coherent signal integration operation integrates the pilot channel of the GNSS signal over the coherent period of time to generate the first resulting signal.

8. One or more tangible, non-transitory, computer-readable media, storing computer-readable instructions configured to cause one or more processors of user equipment to:
    receive a first data input indicative of a current condition of the user equipment or an expected condition of the user equipment, and a second data input indicative of a current motion of the user equipment or an expected motion of the user equipment,
    determine a coherent period of time based on the first data input and the second data input,
    perform respective coherent signal integration operations using the first data input and the second data input based on each pilot channel of a global navigation satellite systems (GNSS) signal received by the user equipment from a satellite to generate a first resulting signal,
    perform a non-coherent operation based on the first resulting signal to generate a second resulting signal, and output a position of the user equipment based on the second resulting signal.

9. The one or more tangible, non-transitory, computer-readable media of claim 8, wherein the computer-readable instructions cause the one or more processors of the user equipment to generate respective tracking loops for each pilot channel of the GNSS signal.

10. The one or more tangible, non-transitory, computer-readable media of claim 8, wherein the computer-readable instructions cause the one or more processors of the user equipment to determine the coherent period of time based on the first data input and the second data input by comparing the first data input or the second data input to a plurality of pre-defined values for the coherent period of time associated with the first data input or the second data input.

11. The one or more tangible, non-transitory, computer-readable media of claim 10, wherein the plurality of pre-defined values is stored in a look-up table, a binary decision tree, or both.

12. The one or more tangible, non-transitory, computer-readable media of claim 8, wherein the second data input comprises a velocity associated with the user equipment, an acceleration associated with the user equipment, or both.

13. The one or more tangible, non-transitory, computer-readable media of claim 8, wherein the computer-readable instructions are configured to cause the one or more processors of user equipment to determine the current motion of the user equipment, wherein the current motion comprises a change in orientation of the user equipment.

14. A method, comprising:
receiving, via a receiver of user equipment, a plurality of global navigation satellite system (GNSS) signals from a plurality of satellites, the plurality of GNSS signals comprising respective pilot channels;
receiving, via processing circuitry of the user equipment, a first data input indicative of a temperature associated with an oscillator of the receiver or a change in temperature associated with the oscillator, and a second data input indicative of a motion associated with the user equipment or a change in the motion associated with the user equipment;
determining respective coherent periods of time based on comparing the first data input or the second data input to a threshold;
performing, via the processing circuitry, respective coherent operations against the respective pilot channels of the plurality of GNSS signals over the respective coherent periods of time based on the first data input and the second data input to generate first respective resulting signals;
performing, via the processing circuitry, respective non-coherent operations based on the first respective resulting signals to generate second respective resulting signals; and
outputting, via the processing circuitry, a position of the user equipment based on the second respective resulting signals after performing the respective non-coherent operations.

15. The method of claim 14, comprising generating, via the processing circuitry, respective tracking loops for the respective pilot channels of the plurality of GNSS signals.

16. The method of claim 15, wherein the motion comprises a rotation of the user equipment, a tilt of the user equipment, a linear motion of the user equipment, a non-linear motion of the user equipment, or a combination thereof.

17. The method of claim 15, comprising determining, via the processing circuitry, the motion associated with the user equipment.

18. The method of claim 14, wherein the second data input is indicative of the motion associated with the user equipment, the change in the motion associated with the user equipment, or both, and wherein the second data input is received from an accelerometer associated with the oscillator, a gyroscope associated with the oscillator, an inertial measurement unit associated with the oscillator, or any combination thereof.

19. The method of claim 14, wherein the respective coherent operations comprise coherent signal integration operations that use the first data input and the second data input as processing parameters to generate the first respective resulting signals.

20. The method of claim 14, wherein determining the respective coherent periods of time based on comparing the first data input or the second data input to a threshold comprises decreasing the respective coherent periods of time based on the first data input or the second data input surpassing the threshold.

* * * * *